United States Patent
Albrecht et al.

(10) Patent No.: US 6,925,349 B2
(45) Date of Patent: Aug. 2, 2005

(54) DEVICE AND METHOD FOR SYNCHRONIZING A PLURALITY OF ELECTRIC DRIVE UNITS IN A PAPER PROCESSING MACHINE

(75) Inventors: Kai Albrecht, Heidelberg (DE); Holger Faulhammer, Stuttgart (DE); Georg Roessler, Angelbachtal (DE); Eckehard Sommer, Dielheim (DE); Bernhard Wagensommer, Malsch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 14 days.

(21) Appl. No.: 10/293,644

(22) Filed: Nov. 13, 2002

(65) Prior Publication Data

US 2003/0114938 A1 Jun. 19, 2003

(30) Foreign Application Priority Data

Nov. 15, 2001 (DE) .......................................... 101 56 209

(51) Int. Cl.[7] ............................ G05B 19/18; D21F 7/00
(52) U.S. Cl. ........................... 700/128; 162/252; 700/3; 700/20
(58) Field of Search ............................ 700/2, 3, 9, 13, 700/19, 20, 63, 127, 128; 162/252, 256, 262, 253; 492/10

(56) References Cited

U.S. PATENT DOCUMENTS

| | | | | |
|---|---|---|---|---|
| 4,314,334 A | * | 2/1982 | Daughton et al. | 710/3 |
| 4,955,290 A | * | 9/1990 | Kipphan et al. | 101/183 |
| 5,222,017 A | * | 6/1993 | Yellowley et al. | 700/3 |
| 5,361,277 A | * | 11/1994 | Grover | 375/356 |
| 5,463,296 A | * | 10/1995 | Fugere et al. | 318/568.2 |
| 6,625,498 B1 | * | 9/2003 | Kurakake et al. | 700/3 |
| 2002/0111696 A1 | | 8/2002 | Albrecht et al. | 700/3 |
| 2003/0041089 A1 | * | 2/2003 | Mauro | 709/106 |

FOREIGN PATENT DOCUMENTS

| | | |
|---|---|---|
| DE | 19527089 | 1/1997 |
| DE | 19651427 | 6/1998 |
| DE | 19727824 | 11/1998 |
| DE | 10059270 | 6/2002 |
| DE | 10208791 | 9/2002 |

OTHER PUBLICATIONS

INTEL Specification for the 80960SB Microprocessor, Nov. 1993.*

* cited by examiner

Primary Examiner—Paul Rodriguez
(74) Attorney, Agent, or Firm—Davidson, Davidson & Kappel, LLC

(57) ABSTRACT

The present invention relates to a device and a method for synchronizing processes which are executed on a plurality of units (2a, 2b, 2c), in particular, in paper-processing machines, the units (2a, 2b, 2c) being connected to a central control unit (1) via a data bus (6). The present invention is characterized in that the central control unit (1) is designed for distributing movement commands via a data bus (6) to a plurality of units (2a, 2b, 2c), the movement commands containing the instant at which these commands are executed, and that provision is made for the units (2a, 2b, 2c) which keep available the absolute time to synchronously execute these commands at the instant communicated via the commands.

13 Claims, 2 Drawing Sheets

US 6,925,349 B2

DEVICE AND METHOD FOR SYNCHRONIZING A PLURALITY OF ELECTRIC DRIVE UNITS IN A PAPER PROCESSING MACHINE

Priority to German Patent Application No. 101 56 209.8, filed Nov. 15, 2001 and hereby incorporated by reference herein, is claimed.

BACKGROUND INFORMATION

The present invention relates to a device for synchronizing processes which are executed on a plurality of units, in particular, in paper-processing machines and a method for synchronizing a plurality of such units.

Printing presses have a plurality of rotationally movable parts which have to be set into rotary motion in an angularly synchronous manner. To this end, in the past, these parts to be rotationally driven were coupled via a mechanical connection as, for example, a line shaft or a continuous gear train, which, however, had the disadvantage, among other things, that unpleasant vibrations occurred in such a machine. Therefore, recently the trend for the printing press parts to be rotationally driven is no longer to be mechanically synchronized with perfect angular accuracy but to be provided with separate electric drives which are then synchronized with each other via an electronic control. To this end, however, electronic circuits are required which correct the separate drive motors in such a manner that they work in an angularly synchronous manner. Moreover, the electronic controllers have to work rapidly and accurately. As a rule, greater difficulties occur especially when changing the operating speed of a printing press or of parts of a printing press. In this case, it must be ensured that the individual electric drives continue to work in an angularly synchronous manner after the speed change.

A method and corresponding device for controlling the exact angular synchronism of a plurality of electric drives is known from German Patent DE 197 27 824 C1. This system is composed of a control computer, which represents a central master system, and a plurality of distributed drive controllers, which are arranged near the electric drive to be controlled. In this context, the distributed drive controllers and the master computer are interconnected via a synchronization bus. In this connection, the master system supplies machine speed setpoints to the distributed drive controllers via the synchronization bus. The rotational speed setpoints are locally generated from these machine speed setpoints in the respective distributed drive controllers. To allow angular synchronization between the individual drive units, the distributed drive controllers contain angle setpoint generators which are composed of a master pointer in the respective drive controller. When the machine speed setpoints have now been distributed to the drive controllers via the synchronization bus, then the master system sends a so-called "interrupt" to all drive controllers. This interrupt is used for synchronization and ensures that all distributed drive controllers run their computing cycles with the same current machine speed setpoint. The appropriate rotational speed and angle setpoints for the respective drive are then calculated in the distributed drive controllers. Such a drive control system for synchronizing a plurality of drive units offers the advantage that the synchronization bus is relieved since it only has to distribute the common machine speed setpoints and interrupts. Moreover, it is proposed to send so-called "asynchronous setpoint values", such as an offset angle between several drive units, over a separate bus which is exclusively responsible for control and parameterization data.

BRIEF SUMMARY OF THE INVENTION

Starting from the prior art, an object of the present invention is to create an electrically synchronized drive combination of a plurality of electric drives without having to transmit time-critical setpoint values over a bus that assumes the communication between the drive units and a central control.

The present invention provides a device for synchronizing processes which are executed on a plurality of further control units (2a, 2b, 2c), in particular, in paper-processing machines, the further control units (2a, 2b, 2c) being connected to a central control unit (1) via a data bus (6), wherein the central control unit (1) is designed for distributing movement commands via a data bus (6) to a plurality of the further control units (2a, 2b, 2c), the movement commands containing the instant at which these commands are executed; and provision is made for the further control units (2a, 2b, 2c) which keep available the absolute time to synchronously execute these commands at the instant communicated via the commands.

The present invention also provides a method for synchronizing processes which are executed on a plurality of further control units (2a, 2b, 2c), in particular, in paper-processing machines, the further control units (2a, 2b, 2c) being connected to a central control unit (1) via a data bus (6). The central control unit (1) distributes movement commands via a data bus (6) to a plurality of further control units (2a, 2b, 2c), the movement commands containing the instant at which these commands are executed; and the further control units (2a, 2b, 2c) which keep available an absolute time synchronously execute these commands at the instant communicated via the commands.

The device and method according to the present invention offer the great advantage that no time-critical setpoint values have to be sent over the data bus. To this end, the device includes a central control unit which is connected with distributed further control units via a data bus; an absolute system time which can be synchronized via the data bus being kept available both on the central control unit and on the distributed further control units. The central control unit may be a central control computer. Since all units of the device according to the present invention keep available this absolute system time, it is possible to send movement commands from the central control unit to the distributed further control units, the movement commands not only containing the position, speed and acceleration of particular forms of movement but, in particular, also the instant at which they are to be carried out in the distributed units. Therefore, the instant at which the movement commands arrive at the distributed further control units is unimportant as long as they arrive in time before the instant at which the movement command is to be executed. This can be ensured by sending the movement commands to the distributed units timely in advance. By freeing the data bus from time-critical setpoint values, it is made possible to use a fairly simple data bus as, for example, a CAN (controller area network) bus to transmit the movement commands from the central computer to the distributed units. This provides a great price advantage over systems which are dependent on the transmission of time-critical setpoint values because these have to resort to fast and expensive drive data bus technologies as, for example, SERCOS (SErial Real-time COmmunications System).

If the distributed further control units have separate computers, then this allows the setpoint values to be locally generated from the movement commands which are sent by the central control unit. Then, a setpoint generator computes the position, speed and acceleration setpoints in the respective distributed further control unit so that all drives that are controlled by the distributed further control units work in an angularly synchronous manner.

The use of a CAN bus as the data bus allows the drive concept according to the present invention to be implemented in a particularly cost-effective manner. CAN buses indeed have a relatively low data transfer rate but have proven efficient in industrial control technology and, in this case, are the means of choice since, due to the time-uncritical values that are transmitted over the field bus, no high demands need to be placed on speed.

If, in addition to the arithmetic units for setpoint generation, further arithmetic units exist in the distributed further control units, then this offers the advantage that additional functions can be implemented on these further arithmetic units. In this manner, the setpoint values required for synchronization can be processed for an individual drive unit in such a way that special functions as, for example, an electronic cam disc are possible. Nevertheless, these distributed further control units provided with the special functions work with perfect angular accuracy and, consequently, synchronously to each other.

Drive controllers present in the distributed further control units are used to compare the setpoint values, which are present in the distributed further control units and which have possibly been processed with special functions, to actual values present at the electric drive and, if necessary, to correct the actual values to the setpoint values. In this manner, the electric drives are corrected in such a manner that they are synchronous to each other.

It is useful to define at least one of the distributed drive units as a so-called "master" while the other drive units are defined as so-called "slaves". In this manner, it is possible to send so-called "positioning commands" to the drive units that are defined as slaves, the position commands making it possible, for example, to change the rotational angle of the slave units by a desired angle with respect to the master. To this end, the slave units receive a command which refers to the setpoint angle at a specific point in time and which assures that this differential angle is adjusted by increasing or reducing this setpoint rotational speed of the slave drive for a short time.

If, in addition to the drive commands, data for parameterization and diagnosis are also sent via the existing data bus, then a further data bus, as recommended for these tasks in German Patent DE 197 27 824 C1, can be dispensed with. Since it is also possible to synchronize the global system time in all distributed units and the central control unit via this one data bus, no separate data bus is required for this either. Therefore, the communication required between the distributed further control units and the central control unit for a method or device according to the present invention can be accomplished with a single data bus.

BRIEF DESCRIPTION OF THE DRAWINGS

Further advantageous embodiments can be gathered from the Figures. An exemplary embodiment is described and explained in greater detail with reference to the Figures.

DETAILED DESCRIPTION

Figure 1:
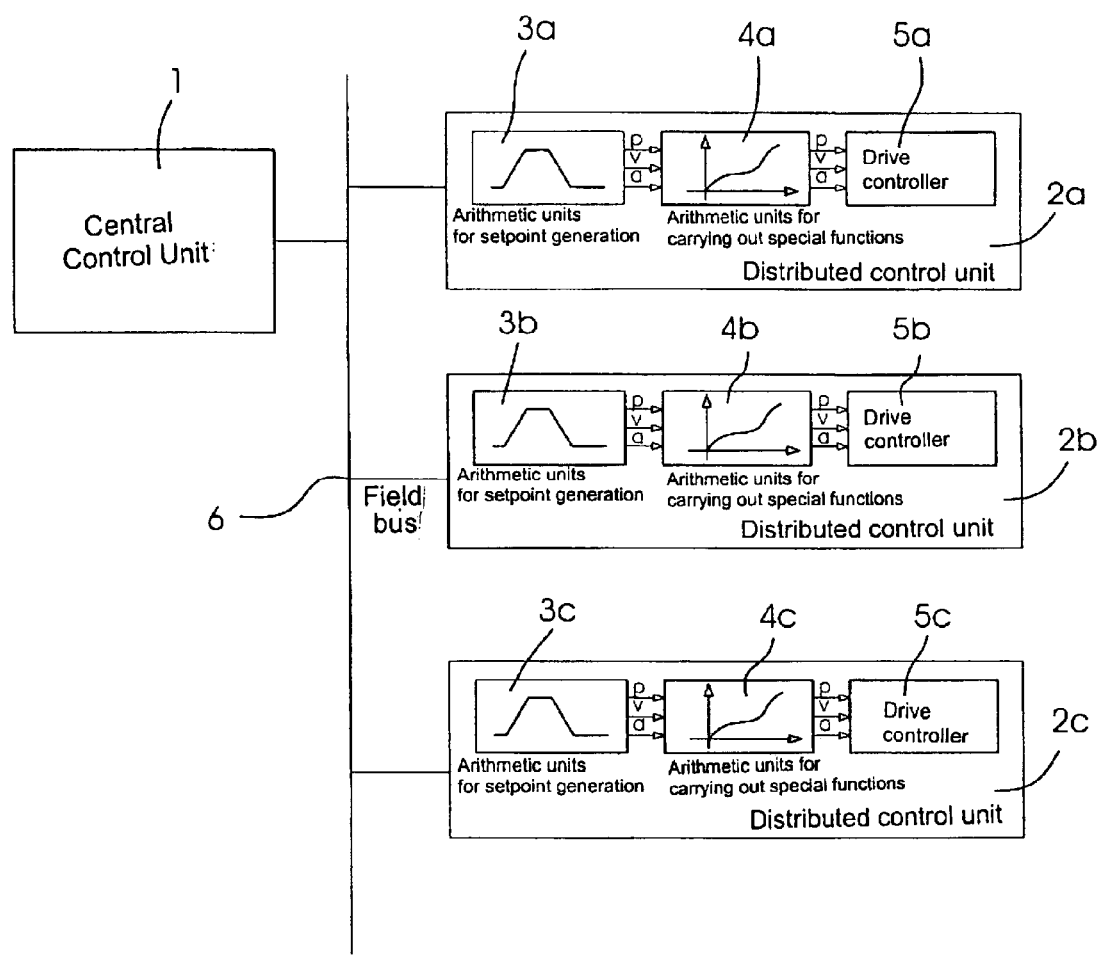
FIG. 1 shows the design of a drive device according to the present invention.

A possible design of a device according to the present invention is shown in FIG. 1. The device is composed of a central control unit 1 and three distributed further control units 2a, 2b, 2c, the distributed further control units 2a, 2b, 2c representing the drive controls of electric drives which are not shown here. For communication between distributed further control units 2a, 2b, 2c and central control unit 1, provision is made for a data bus 6, which is a simple field bus as, for example, a CAN bus. Via data bus 6, movement commands are sent from central control unit 1 to distributed units 2a, 2b, 2c. Distributed further control units 2a, 2b, 2c are composed of an arithmetic unit 3a, 3b, 3c respectively, the arithmetic units generating setpoint values from the movement commands sent by the central control unit. These setpoint values can be further processed by further arithmetic units 4a, 4b, 4c in which special functions are stored so that each distributed further control unit 2a, 2b, 2c is able to perform different sequences of movements. This is useful, for example, if one of the electric drives controlled by distributed further control units 2a, 2b, 2c has to rotate slower or faster in a certain ratio to the other electric drives. In this context, the electric drives are controlled by drive controllers 5a, 5b, 5c, which compare the actual values of the electric drives to the setpoint values from further arithmetic units 4a, 4b, 4c and correct them to the setpoints.

As indicated in FIG. 1, it is possible to connect further distributed units to field bus 6 in addition to the three distributed further control units 2a, 2b, 2c shown here until the maximum capacity of the data bus is reached. In the embodiment shown in FIG. 1, distributed further control units 2a, 2b, 2c are designed as drive boards to control the electric drives of a printing press. Printing presses have many rotationally movable driven parts which, as mentioned at the outset, are increasingly driven by separate electric motors but have to synchronized with each other as in the case of a mechanical line shaft or a gear train. To this end, one of the electric drives is selected to be a so-called "virtual master drive" while the other electric drives work as so-called "virtual slave drives". Usable as master drive is, in particular, the drive board of the main drive of a printing press. The difference between the master drive and the slave drives lies only in that the slave drives receive further movement commands in addition to those sent to all further control units 2a, 2b, 2c, the further movement commands each affecting only one specific slave drive.

Figure 2:
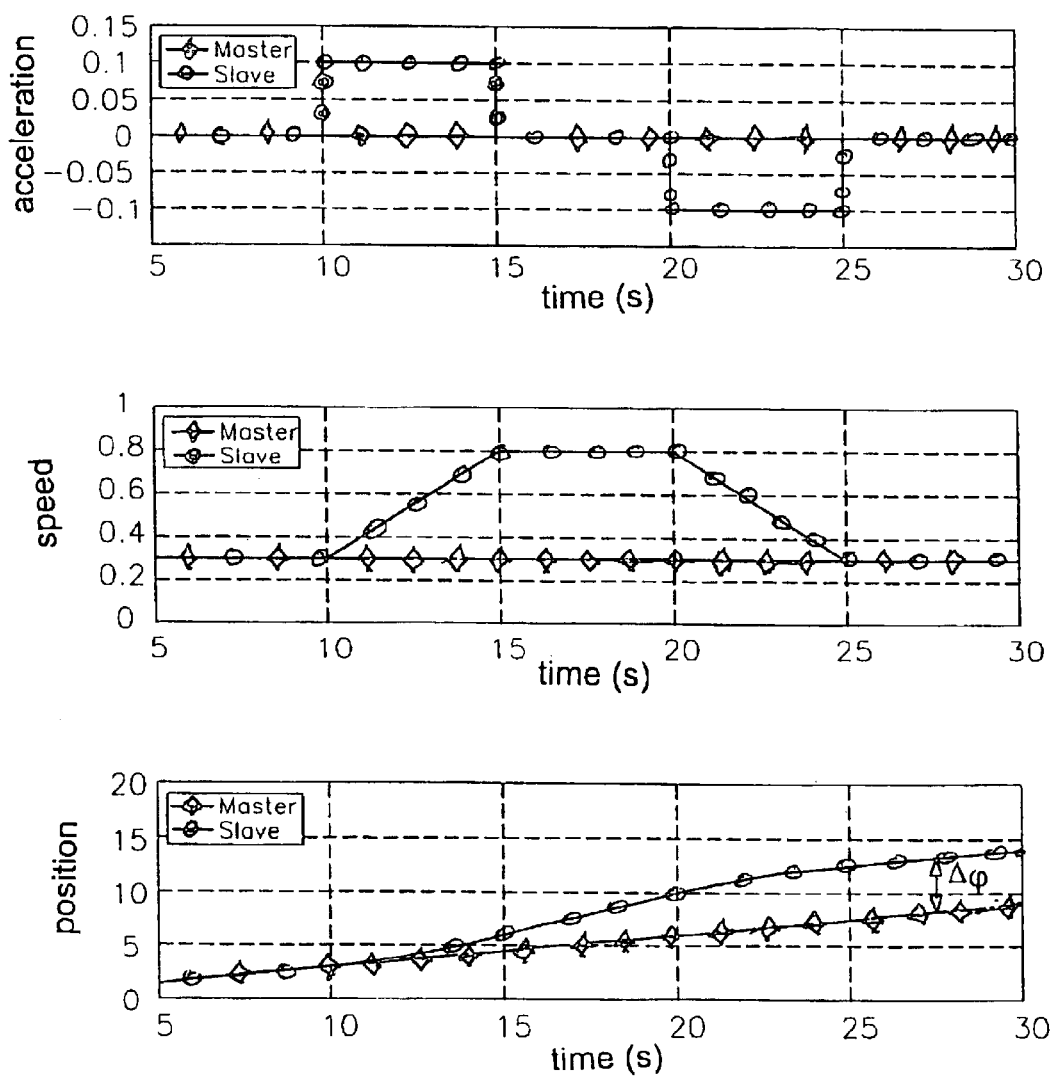
FIG. 2 shows position, speed and acceleration diagrams which represent a so-called "positioning command" of a slave drive relative to a master drive.

The difference between main drive and slave drive also follows from FIG. 2. Here, three diagrams can be seen in which the acceleration, speed and angular position of a master drive and of a slave drive are plotted over time, respectively. As long as no slave-specific movement commands are given via data bus 6, both the main drive and the auxiliary drives run completely synchronously with each other. However, if the intention is for one of the auxiliary drives to be rotated by a certain angle $\Delta\phi$ with respect to the main drive, then a process is initiated as shown in FIG. 2. In this process, central control unit 1 sends an additional movement command over data bus 6 to the respective distributed further control unit. For instance, the intention is for the electric drive which is controlled by distributed further control unit 2c to be rotated by a certain angle $\Delta\phi$ with respect to the main drive or to the other auxiliary drives. When verbally described, the movement command shown in FIG. 2 reads as follows: At instant t=10 sec, the angle of the slave drive is to be moved by angle $\Delta\phi$ relative to the actual angle at instant t=10 sec. This movement command is sent by central control unit 1 in coded form via data bus 6 to the respective distributed further control unit, here 2c. Then, the setpoint values for speed, acceleration and position are calculated on distributed further control unit 2c using setpoint generator 3c. The movement command gets executed in that at instant t=10 sec, the electric drive of the slave drive accelerates with constant acceleration to a higher rotational speed until instant t=15 sec, then maintains the speed constant for a further period of 5 sec and, subsequently, is decelerated during another 5 sec with constant negative acceleration to its original speed. Thus, it is guaranteed that at instant t=25 sec, the slave drive runs completely synchronously with the main drive or the other auxiliary drives again. Since the synchronization takes place on the basis of a uniform time base, this time is stored both in distributed further control units 2a, 2b, 2c and in central control unit 1 as the so-called "absolute system time". The system time can be generated by clock generators on the individual further control units 2a, 2b, 2c and central control unit 1, it being possible to synchronize the clock generators via field bus 6.

With regard to the exact procedure for establishing a uniform time base, reference is made to U.S. Patent Publication No. 2002/0111696, which is hereby incorporated by reference herein, and which deals with the temporal synchronization of processes, in particular, in the control of a printing press.

In addition, data for parameterization and diagnosis of further control units 2a, 2b, 2c can also be exchanged via field bus 6. To enable reliable functioning of such a drive system, the movement commands always have to be sent by central control unit 1 to further control units 2a, 2b, 2c in time before the instant at which they have to be executed. This lead time has to take into account the delay time on field bus 6 as well as system dead times. The arithmetic units on further control units 2a, 2b, 2c work at the same computing speed so that no delays can occur between the individual further control units 2a, 2b, 2c in the execution of the movement commands.

List of Reference Numerals
1 Central control unit
2a, 2b, 2c Distributed control units
3a, 3b, 3c Arithmetic units for setpoint generation
4a, 4b, 4c Arithmetic units for carrying out special functions
5a, 5b, 5c Drive controller
6 Field bus

What is claimed is:

1. A device for synchronizing processes in a paper processing machine comprising:
   a central control unit;
   a data bus; and
   a plurality of further control units being connected to the central control unit via the data bus, wherein the central control unit distributes movement commands via the data bus to the plurality of further control units, the movement commands including a time instant for executing the movement commands, the further control units maintaining an absolute time to synchronously execute the movement commands at the time instant.

2. The device as recited in claim 1 wherein the central control unit includes a control computer, the plurality of further control units including arithmetic units and being distributed for controlling electric drives of the paper processing machine.

3. The device as recited in claim 1 wherein the data bus is a field bus.

4. The device as recited in claim 3 wherein the data bus is a controller area network bus.

5. The device as recited in claim 1 the further control units include arithmetic units for setpoint generation from the movement commands of the central control unit.

6. The device as recited in claim 5 wherein the further control units have further arithmetic units for processing setpoint values calculated by the arithmetic units, the processing being carried out using functions stored in the further arithmetic units.

7. The device as recited in claim 1 wherein the further control units have arithmetic units and drive controllers for correcting electric drives connected to the further control units according to the inputs received by the drive controllers from the arithmetic units.

8. A method for synchronizing processes in a paper processing machine, the processes being executed by a plurality of distributed control units connected to a central control unit via a data bus, comprising the steps of:
   distributing movement commands by the central control unit via the data bus to the plurality of distributed control units, the movement commands containing a time instant for executing the movement commands; and
   maintaining the distributed control units an absolute time for synchronously executing the movement commands at the time instant.

9. The method as recited in claim 8 wherein the movement commands contain a position, speed and acceleration of electric drives to be controlled.

10. The method as recited in claim 8 wherein the distributed control units are electric drive control units, and further comprising distributing further special movement commands to only selected ones of the plurality of distributed control units.

11. The method as recited in claim 8 further comprising distributing data for parameterization and diagnosis as well as a global system time for maintaining the absolute time required for synchronization of the movement commands via the data bus to the distributed control units.

12. A paper-processing machine comprising:
   a device for synchronizing processes having a central control unit; a data bus; and a plurality of further control units being connected to the central control unit via the data bus, wherein the central control unit distributes movement commands via the data bus to the plurality of further control units, the movement commands including a time instant for executing the movement commands, the further control units maintaining an absolute time to synchronously execute the movement commands at the time instant.

13. The paper-processing machine as recited in claim 12 wherein the machine is a printing press.

* * * * *